(12) United States Patent
Hwang et al.

(10) Patent No.: US 11,626,582 B2
(45) Date of Patent: Apr. 11, 2023

(54) ANODE-FREE PRIMARY BATTERY AND ELECTRODE ASSEMBLY THEREOF

(71) Applicant: National Taiwan University of Science and Technology, Taipei (TW)

(72) Inventors: Bing-Joe Hwang, Taipei (TW); Wei-Nien Su, Taipei (TW); Chen-Jui Huang, Taipei (TW); Shi-Kai Jiang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 99 days.

(21) Appl. No.: 16/823,360

(22) Filed: Mar. 19, 2020

(65) Prior Publication Data

US 2021/0057715 A1 Feb. 25, 2021

Related U.S. Application Data

(60) Provisional application No. 62/889,566, filed on Aug. 21, 2019.

(30) Foreign Application Priority Data

Dec. 3, 2019 (TW) .................................. 108144130

(51) Int. Cl.
*H01M 4/06* (2006.01)
*H01M 6/16* (2006.01)
(Continued)

(52) U.S. Cl.
CPC .............. *H01M 4/06* (2013.01); *H01M 4/505* (2013.01); *H01M 4/525* (2013.01); *H01M 6/164* (2013.01);
(Continued)

(58) Field of Classification Search
None
See application file for complete search history.

(56) References Cited

U.S. PATENT DOCUMENTS

| 2012/0028092 A1 | 2/2012 | Nunome et al. |
| 2013/0202933 A1 | 8/2013 | Nunome et al. |
| (Continued) | | |

FOREIGN PATENT DOCUMENTS

| CN | 107078312 | 8/2017 |
| CN | 110010956 | 7/2019 |
| (Continued) | | |

OTHER PUBLICATIONS

"Office Action of China Counterpart Application", dated Jul. 30, 2021, p. 1-p. 10.

(Continued)

*Primary Examiner* — Laura Weiner
(74) *Attorney, Agent, or Firm* — Karin L. Williams; Mayer & Williams PC

(57) ABSTRACT

The disclosure provides a primary battery and an electrode assembly thereof. The electrode assembly includes a separator, a positive electrode, and a negative electrode current collector. The separator has a positive electrode side and a negative electrode side opposite to each other. The positive electrode is located at the positive electrode side of the separator, and the positive electrode includes a positive electrode current collector and a positive electrode material. The negative electrode current collector is located at the negative electrode side of the separator. The electrode assembly does not include a negative electrode material before charging or activation.

2 Claims, 11 Drawing Sheets

(51) Int. Cl.
H01M 4/505 (2010.01)
H01M 4/525 (2010.01)
H01M 4/02 (2006.01)

(52) U.S. Cl.
CPC ...... H01M 6/166 (2013.01); *H01M 2004/027* (2013.01); *H01M 2004/028* (2013.01); *H01M 2300/0034* (2013.01)

(56) References Cited

U.S. PATENT DOCUMENTS

| | | | |
|---|---|---|---|
| 2016/0072151 A1 | 3/2016 | Zhang et al. | |
| 2016/0240896 A1* | 8/2016 | Zhang | H01M 10/0569 |
| 2017/0365855 A1 | 12/2017 | Ryu et al. | |
| 2019/0214671 A1 | 7/2019 | Chang et al. | |
| 2020/0220220 A1* | 7/2020 | Martin | H01M 10/0569 |

FOREIGN PATENT DOCUMENTS

| | | | |
|---|---|---|---|
| JP | 2015162425 | | 9/2015 |
| JP | 2019-121609 | * | 7/2019 |
| JP | 2019121609 | | 7/2019 |
| KR | 19610002724 | | 4/1961 |
| KR | 20170143373 | | 12/2017 |
| TW | 201842699 | | 12/2018 |
| WO | 2011121693 | | 10/2011 |
| WO | 2013174149 | | 11/2013 |

OTHER PUBLICATIONS

"Office Action of Japan Counterpart Application", dated Sep. 7, 2021, p. 1-p. 5.

Teklay Mezgebe Hagos, et al., "Dual electrolyte additives of potassium hexafluorophosphate and tris (trimethylsilyl) phosphite for anode-free lithium metal batteries." Electrochimica Acta, vol. 316, May 2019, pp. 52-59.

Tesfaye Teka Hagos, et al., "Locally Concentrated LiPF6 in a Carbonate-Based Electrolyte with Fluoroethylene Carbonate as a Diluent for Anode-Free Lithium Metal Batteries." ACS Applied Materials & Interfaces, vol. 11, No. 10, Feb. 2019, pp. 9955-9963.

Addisu Alemayehu Assegie, et al., "Multilayer-graphene-stabilized lithium deposition for anode-Free lithium-metal batteries." Nanoscale, vol. 11, No. 6, Jan. 2019, pp. 2710-2720.

"Search Report of Europe Counterpart Application", dated Dec. 11, 2020, p. 1-p. 8.

Office Action of Korean Counterpart Application, with English translation thereof, dated Jul. 7, 2021, pp. 1-8.

* cited by examiner

ANODE-FREE PRIMARY BATTERY AND ELECTRODE ASSEMBLY THEREOF

CROSS-REFERENCE TO RELATED APPLICATION

This application claims the priority benefits of U.S. provisional application Ser. No. 62/889,566, filed on Aug. 21, 2019, and Taiwan application serial no. 108144130, filed on Dec. 3, 2019. The entirety of each of the above-mentioned patent applications is hereby incorporated by reference herein and made a part of this specification.

BACKGROUND OF THE INVENTION

1. Field of the Invention

The disclosure relates to a battery and an electrode assembly thereof, and in particular to an anode-free primary battery and an electrode assembly thereof.

2. Description of Related Art

Although the technical principles of primary batteries and secondary batteries (such as lithium-ion batteries) are similar, there are still slight differences in terms of industrial structures, application fields, expected performance and the like. For example, the primary batteries are often used in medical treatment, wireless communications, Internet of Things and the like, and the performance thereof focuses on low leakage, low loss, stable output and the like. The secondary batteries are often used in mobile phones, electric vehicles, large-sized power storage industries and the like, and the performance thereof focuses on charge and discharge speeds, capacity retention and the like. Generally, the primary batteries may only be discharged once, so how to increase the energy densities of the primary batteries with the same volume and enable the primary batteries to have good stability at the same time is one of the goals expected to be achieved by those skilled in the art.

SUMMARY OF THE INVENTION

The disclosure provides a primary battery and an electrode assembly thereof, which have good energy density and stability.

The electrode assembly for the primary battery of the disclosure includes a separator, a positive electrode, and a negative electrode current collector. The separator has a positive electrode side and a negative electrode side opposite to each other. The positive electrode is located at the positive electrode side of the separator, and the positive electrode includes a positive electrode current collector and a positive electrode material. The negative electrode current collector is located at the negative electrode side of the separator. The electrode assembly does not include a negative electrode material.

In one embodiment of the disclosure, the positive electrode material is disposed between the positive electrode current collector and the separator.

In one embodiment of the disclosure, the positive electrode material includes lithium metal oxides, Li phosphate compounds, Li contained redox compounds or a combination thereof.

In one embodiment of the disclosure, the electrode assembly is free from the negative electrode material before charging or activation.

In one embodiment of the disclosure, at least one of the positive electrode current collector and the negative electrode current collector includes a metal foil or metal sponge.

The primary battery of the disclosure includes an electrode assembly and an electrolyte. The electrode assembly includes a separator, a positive electrode, a negative electrode current collector and the electrolyte. The separator has a positive electrode side and a negative electrode side opposite to each other. The positive electrode is located at the positive electrode side of the separator, and the positive electrode includes a positive electrode current collector and a positive electrode material. The negative electrode current collector is located at the negative electrode side of the separator. The electrolyte is provided between the negative electrode current collector and the positive electrode current collector. The primary battery does not include a negative electrode material.

In one embodiment of the disclosure, the electrolyte includes at least a lithium salt, a first organic solvent and a second organic solvent. The first organic solvent is different from the second organic solvent.

In one embodiment of the disclosure, the lithium salt includes at least one of $LiPF_6$, $LiBF_4$, $LiClO_4$, $LiAsF_6$, $LiSbF_6$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$ and LiDFOB (lithium difluoro(oxalato)borate).

In one embodiment of the disclosure, a concentration of the lithium salt is within a range from 0.5 M to 4.2 M.

In one embodiment of the disclosure, the first organic solvent includes a fluorine-containing carbonate compound, and the second organic solvent includes a carbonate compound.

In one embodiment of the disclosure, the first organic solvent includes fluoroethylene carbonate (FEC), and the second organic solvent includes at least one of ethylene carbonate (EC) and diethyl carbonate (DEC).

In one embodiment of the disclosure, a volume ratio (v/v) of the first organic solvent to the second organic solvent in the electrolyte is about 4:1 to 1:4.

In one embodiment of the disclosure, the first organic solvent includes a fluorine-containing carbonate compound, and the second organic solvent includes an ether compound.

In one embodiment of the disclosure, the first organic solvent includes fluoroethylene carbonate (FEC), and the second organic solvent includes 1,1,2,2-tetrafluoroethyl-2,2,3,3-tetrafluoropropyl ether (TTE) or 1,1,2,2-tetrafluoroethyl-2,2,3,3,3-pentafluoropropyl ether (TPE).

In one embodiment of the disclosure, a volume ratio (v/v) of the first organic solvent to the second organic solvent in the electrolyte is about 4:1 to 1:4.

In one embodiment of the disclosure, the positive electrode material is disposed between the positive electrode current collector and the separator.

In one embodiment of the disclosure, the electrode assembly is free from the negative electrode material before charging or activation.

In one embodiment of the disclosure, at least one of the positive electrode current collector and the negative electrode current collector includes a metal foil or metal sponge.

In one embodiment of the disclosure, the electrolyte is solid-state or gel-state.

Based on the above, since the electrode assembly for the primary battery does not include the negative electrode material, a space originally configured to hold the negative electrode material in the primary battery may be configured to receive more positive electrode material (or referred to as a cathode material) and electrolyte. Therefore, under the same volume, the primary battery may provide a higher energy density.

DESCRIPTION OF THE EMBODIMENTS

Figure 1:
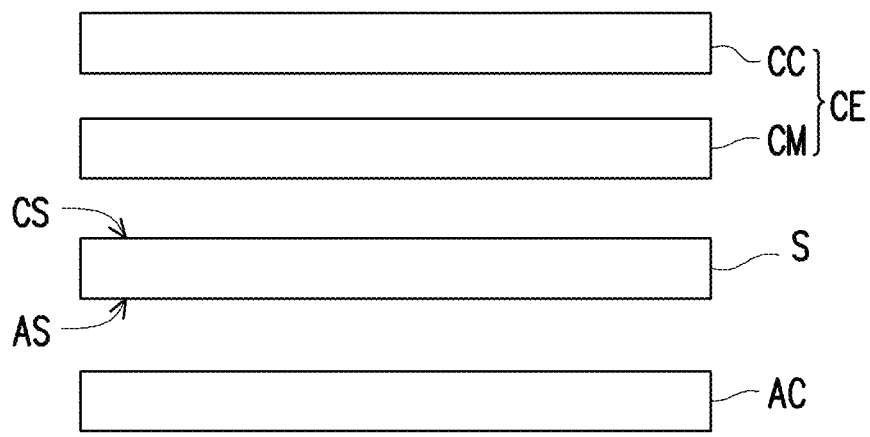
FIG. 1 is an exploded diagram of an electrode assembly of one embodiment of the disclosure.

The disclosure will be described more comprehensively below with reference to the drawings of the present embodiment. However, the disclosure may be also implemented in various forms, and shall not be limited to the embodiments described herein. For the sake of clarity, thicknesses of layers and regions in the drawings are enlarged. The same or similar reference numbers indicate the same or similar elements, and the following paragraphs will not repeat them one by one. In addition, the directional terms mentioned in the embodiments, such as: up, down, left, right, front, or back, etc. are only directions referring to the accompanying drawings. Therefore, the directional terms used are for the purpose of explaining, but not intended to limit the disclosure.

It will be understood that when an element is, for example, referred to as being "on" or "connected to" another element, it may be directly on or connected to the other element, or there is an intermediate element. When an element is referred to as being "directly on" or "directly connected to" another element, there is no intermediate element.

The terms "about", "approximately" or "substantially" as used herein include values mentioned and average values of specific values capable of being determined by those of ordinary skill in the art within an acceptable deviation range, and measurement discussed and a specific number (i.e., limitation to a measurement system) of measurement-related errors are considered. For example, "about" may be expressed within one or more standard deviations of the value. Furthermore, the terms "about", "approximately" or "substantially" used herein may select a more acceptable deviation range or standard deviation according to optical properties, etching properties or other properties, and may not to apply one standard deviation to all the properties.

The wording used herein is used only to illustrate exemplary embodiments, but not intended to limit the disclosure. In this case, a singular form includes a plural form unless otherwise explained in the context.

Figure 2:
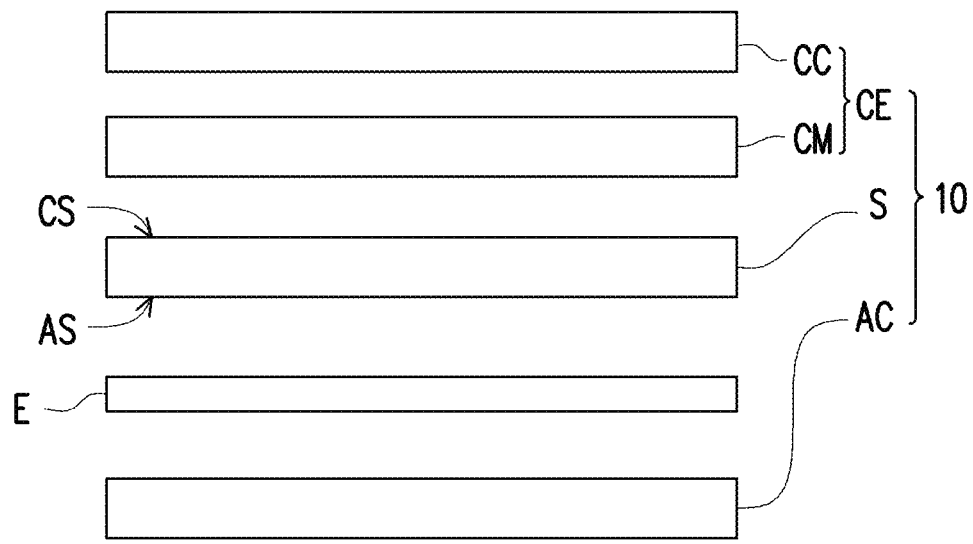
FIG. 2 is an exploded diagram of a primary battery of one embodiment of the disclosure.

FIG. 1 is an exploded diagram of an electrode assembly of one embodiment of the disclosure. FIG. 2 is an exploded diagram of a primary battery of one embodiment of the disclosure.

Referring to FIG. 1, the electrode assembly 10 for a primary battery includes a separator S, a positive electrode CE, and a negative electrode current collector AC. In the present embodiment, the electrode assembly 10 may be applied to a lithium primary battery, but the disclosure is not limited thereto. In other embodiments, the electrode assembly 10 may also be applied to other primary batteries, such as a sodium primary battery and a potassium primary battery.

The separator S may have a positive electrode side CS and a negative electrode side AS opposite to each other. It should be understood that the "positive electrode side" used herein denotes a side, adjacent to the positive electrode CE, in the two opposite sides of the separator S. In the same way, the "negative electrode side" used herein denotes a side, adjacent to the negative electrode current collector AC, in the two opposite sides of the separator S. The separator S may include an insulating material. For example, the separator S may be polyethylene (PE), polypropylene (PP), or a multi-layer composite structure of the above materials, such as PE/PP/PE.

The positive electrode CE may include a positive electrode current collector CC and a positive electrode material CM, and the positive electrode CE may be disposed at the positive electrode side CS of the separator S. In the present embodiment, the positive electrode material CM may be disposed between the positive electrode current collector CC and the separator S. The positive electrode material CM may include a lithium metal oxide, a phosphate compound, a Li contained redox compound and the like. For example, the positive electrode material CM (or referred to as a cathode material) may include $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$, $LiFePO_4$, $LiMn_{0.5}Ni_{0.5}O_2$, $LiMn_{1/3}Co_{1/3}Ni_{1/3}O_2$, $LiMc_{0.5}Mn_{1.5}O_4$, $Li[Ni_{x/2}Li_{(1-x)/3}Mn_{(2-x/2)/3}]O_2$, $Li_2S$ or a combination thereof, x is greater than 0 and less than 1, and Mc may be a divalent metal. In the present embodiment, the positive electrode current collector CC may include a metal foil, such as an aluminum foil. In some embodiments, the positive electrode material CM may be disposed on the positive electrode current collector CC by a coating method.

The negative electrode current collector AC is disposed at the negative electrode side AS of the separator S. In the present embodiment, the negative electrode current collector AC may include a metal foil or metal sponge. That is, at least one of the negative electrode current collector AC and the positive electrode current collector CC may include the metal foil or metal sponge. The metal foil may be a copper foil or copper sponge, a nickel foil or nickel sponge, a high-conductivity stainless steel foil or sponge, and an aluminum foil. In some embodiments, other materials may further be modified on the metal foil of the negative electrode current collector AC, such as other metals (such as Au, Sn, Zn, Ag, or In) having materials different from that of the metal foil.

In the present embodiment, the electrode assembly 10 for the primary battery does not include a negative electrode material (also referred to as an anode material), that is, no negative electrode material is provided between the separator S and the negative electrode current collector AC. Therefore, when the electrode assembly 10 of the present embodiment is applied to the primary battery, it may also be referred to as a negative electrode-free primary battery (or an anode-free primary battery). In the present embodiment, since the electrode assembly 10 for the primary battery does not include the negative electrode material, a space originally configured to hold the negative electrode material in the primary battery may be configured to receive more positive electrode material (or referred to as the cathode material) and/or electrolyte. Therefore, under the same volume, the negative electrode-free primary battery may provide a higher energy density.

According to another aspect, since the negative electrode material usually includes a highly active metal, such as metal lithium or metal sodium, the negative electrode-free primary battery is safer and more stable in the manufacturing process and subsequent use or storage. In addition, the negative electrode-free primary battery may also omit common materials used for a negative electrode, such as graphite, silicon carbon, and tin.

Referring to FIG. 2, a primary battery 100 may include an electrode assembly 10 and an electrolyte E. The connection relationships, materials and manufacturing processes of the components in the electrode assembly 10 have been described in detail in the previous section, so descriptions thereof are omitted below.

The electrolyte E may be provided between the negative electrode current collector AC and the positive electrode current collector CC. In the present embodiment, the electrolyte E may be provided between the negative electrode current collector AC and the separator S. The electrolyte E may include at least a lithium salt, a first organic solvent and a second organic solvent.

In some embodiments, the first organic solvent and/or the second organic solvent may include other suitable solvents or additives, but the disclosure is not limited thereto. For example, the first organic solvent may be an mixture including solvents selected from fluoroethylene carbonate (FEC), ethylene carbonate (EC), diethyl carbonate (DEC), ethylmethyl carbonate (EMC), and propylene carbonate (PC), and the second organic solvent may be an mixture including solvents selected from 1,1,2,2-tetrafluoroethyl-2,2,3,3-tetrafluoropropyl ether (TTE), dimethoxyethane, bis(2-methoxyethyl) ether, triethylene glycol dimethyl ether, and tetraethylene glycol dimethyl ether. The electrolyte E may exist in the primary battery 100 in a liquid, solid, or gel state, and the disclosure is not limited thereto.

The lithium salt may include at least one of $LiPF_6$, $LiBF_4$, $LiClO_4$, $LiAsF_6$, $LiSbF_6$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$ and LiDFOB. In the present embodiment, a concentration of the lithium salt may be within a range from 0.5 M to 4.2 M. In this way, the primary battery 100 may have good performance. For example, the primary battery 100 has good performance in the coulombic efficiency and the capacity retention.

In the present embodiment, the first organic solvent may be different from the second organic solvent. For example, in some embodiments, the first organic solvent may include a fluorine-containing carbonate compound, and the second organic solvent may include a carbonate compound, so that the primary battery 100 may have good performance. The fluorine-containing carbonate compound may be, for example, fluoroethylene carbonate (FEC). The carbonate compound may be, for example, ethylene carbonate (EC), propylene carbonate, diethyl carbonate (DEC), propyl acetate (PA), dimethyl carbonate (DMC), ethylmethyl carbonate (EMC), propylene carbonate (PC) or other fluoride-free carbonate compounds. For example, the first organic solvent may include the FEC, and the second organic solvent may include at least one of the EC and the DEC. In the present embodiment, the first organic solvent may be the FEC, and the second organic solvent may be the EC and the DEC. In the present embodiment, a volume ratio (v/v %) of the first organic solvent to the second organic solvent in the electrolyte E is about 4:1 to 1:4. For example, the volume ratio (v/v %) of the first organic solvent to the second organic solvent in the electrolyte E may be about 1:1.

In some other embodiments, the first organic solvent may include a fluorine-containing carbonate compound, and the second organic solvent may include an ether compound, so that the primary battery 100 may have good performance. The fluorine-containing carbonate compound may be, for example, FEC. The ether compound may be, for example, 1,1,2,2-tetrafluoroethyl-2,2,3,3-tetrafluoropropyl ether (TTE) or 1,1,2,2-tetrafluoroethyl-2,2,3,3,3-pentafluoropropyl ether (TPE). In some embodiments, the first organic solvent may be the FEC, and the second organic solvent may be the TTE or TPE, and a volume ratio (v/v %) of the first organic solvent to the second organic solvent in the electrolyte E may be about 1:4 to 4:1. For example, the volume ratio (v/v %) of the first organic solvent to the second organic solvent in the electrolyte E may be about 3:7. In some other embodiments, the first organic solvent may include FEC, and the second organic solvent may include TTE and DMC, and the volume ratio (v/v %) of FEC, TTE, and DMC may be about 3:2:5.

In the present embodiment, the primary battery 100 does not include a negative electrode material, that is, no negative electrode material will be provided between the separator S and the negative electrode current collector AC, so that the primary battery 100 of the present embodiment may also be referred to as a negative electrode-free primary battery. In this way, a space originally configured to hold the negative electrode material in the primary battery may be configured to receive more positive electrode material (or referred to as a cathode material) and electrolyte. Therefore, under the same volume, the negative electrode-free primary battery may provide a higher energy density.

According to another aspect, since the negative electrode material usually includes a highly active metal, such as metal lithium or metal sodium, the negative electrode-free primary battery is safer and more stable in the manufacturing process and subsequent use or storage. In addition, the negative electrode-free primary battery may also omit common materials used for a negative electrode, such as graphite, silicon carbon, and tin.

In addition, in the present embodiment, since the primary battery 100 does not include the negative electrode material (i.e., the primary battery 100 does not have a negative electrode active substance), it needs to be charged and activated before use. In this way, a storage time of the primary battery 100 may be prolonged. A user or a seller may charge and activate the primary battery before use or delivery, so that an electric quantity of the battery is difficulty affected by the storage time. In some embodiments, the primary battery 100 can be activated by applying a low current (e.g., 0.1 mA/cm$^2$) to conduct a slow-charge and a chemical conversion reaction, and then the primary battery 100 can be used after standing for several hours. In some embodiments, the electrode assembly 10 of the primary battery 100 may be free from the negative electrode material before charging or activation.

Features of the disclosure will be described more specifically below with reference to Embodiments 1 to 3 and Comparative Example 1. Although the following Embodiments 1 to 3 are described, the used materials, their quantities and ratios, processing details, processing flow, and the like may be appropriately changed without departing from the scope of the disclosure. Therefore, the disclosure should not be interpreted restrictively by Embodiments 1 to 3 described below. In addition, it should be noted that although a battery of the present embodiment is a primary battery, an electrochemical analysis carried out in the following experiments will still test the performance of the battery in one cycle and multiple cycles, so as to obtain a complete analysis result.

Embodiment 1

Firstly, LiPF$_6$ was dissolved with EC/DEC serving as a solvent to form a LiPF$_6$ solution. Next, the above-mentioned LiPF$_6$ solution was diluted with FEC at a volume ratio of 1:1 to prepare an electrolyte solution of LiPF$_6$ at a concentration of 1 M. In FIG. 3C, FIG. 4, FIG. 5, FIG. 6A to FIG. 6C, and FIG. 8, Embodiment 1 was marked as E1 to make the content shown in the figures more concise and easier to understand.

Embodiment 2

Firstly, LiPF$_6$ was dissolved with EC/DEC serving as a solvent to form a LiPF$_6$ solution. Next, the above-mentioned LiPF$_6$ solution was diluted with FEC at a volume ratio of 1:1 to prepare an electrolyte solution of LiPF$_6$ at a concentration of 2 M. In FIG. 3C, FIG. 4, FIG. 5, FIG. 6A to FIG. 6C, and FIG. 8, Embodiment 2 was marked as E2 to make the content shown in the figures more concise and easier to understand.

Embodiment 3

Figure 10A:
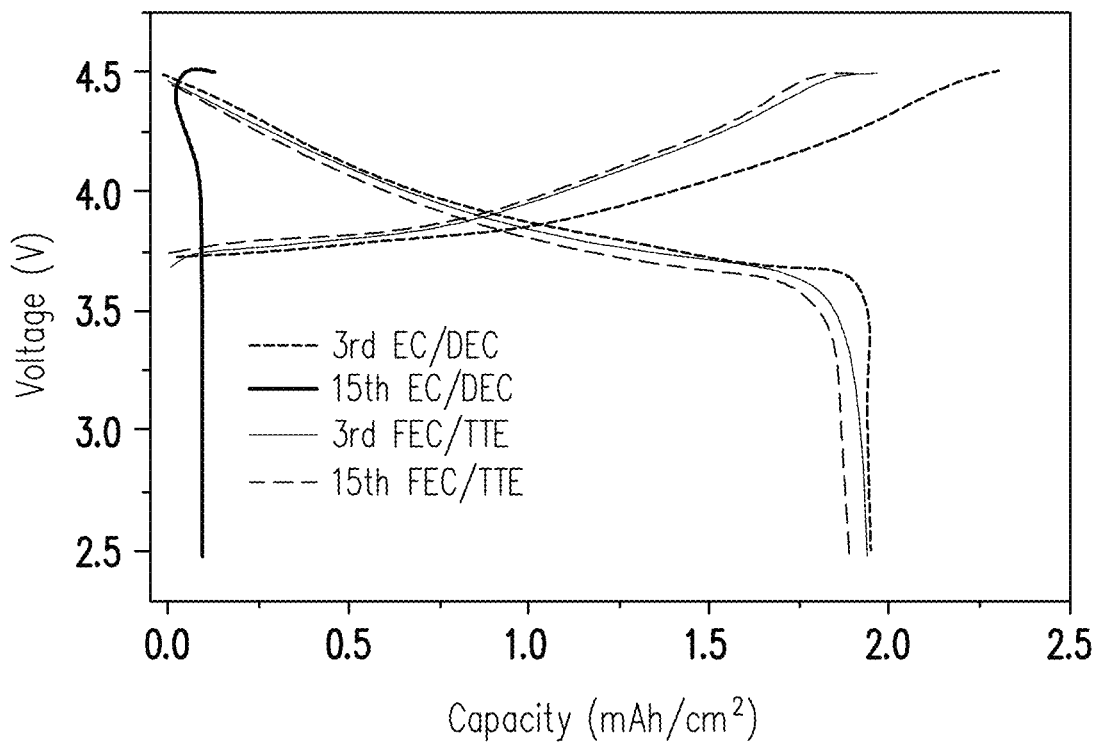
FIG. 10A is a relational graph between a voltage and a capacity in a full battery test carried out by taking Embodiment 3 and Comparative Example 1 as an electrolyte solution of a negative electrode-free primary battery.
Figure 10B:
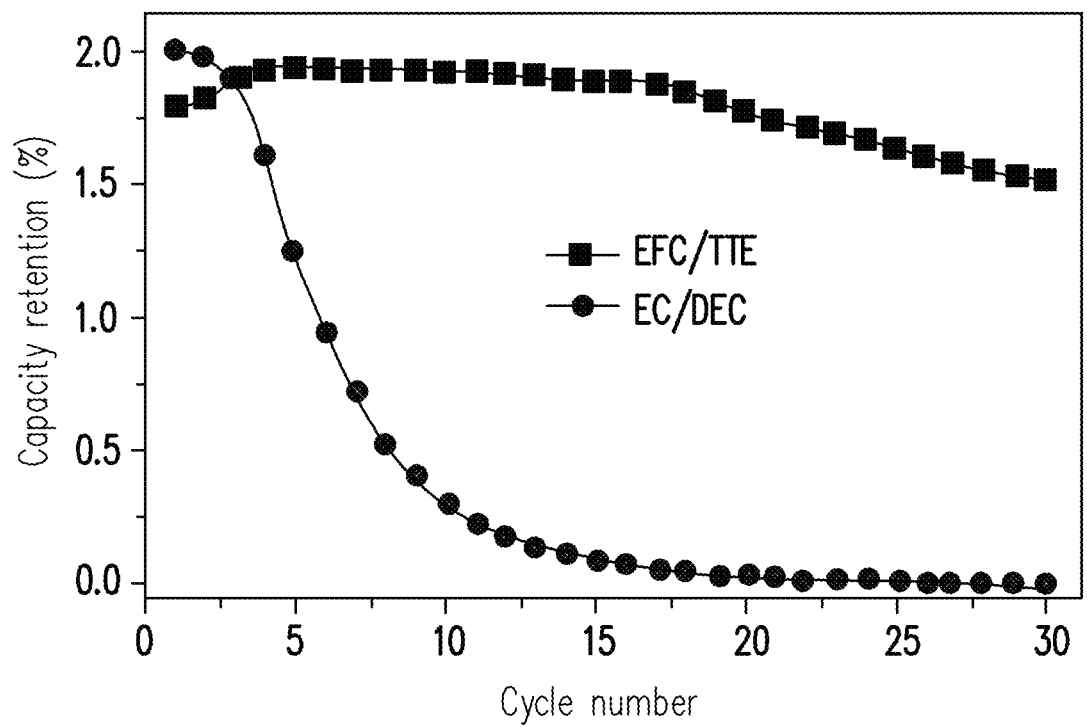
FIG. 10B is a relational graph between a capacity and a cycle number in a full battery test carried out by taking Embodiment 3 and Comparative Example 1 as an electrolyte solution of a negative electrode-free primary battery.
Figure 10C:
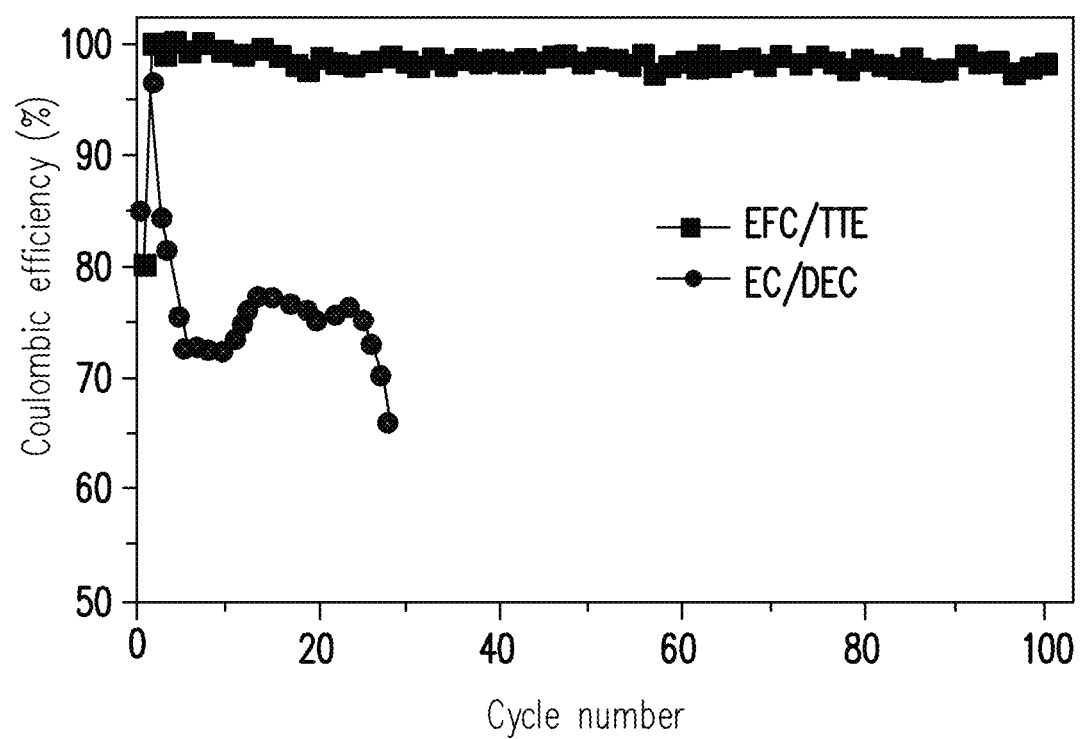
FIG. 10C is a relational graph between the coulombic efficiency and a cycle number in a full battery test carried out by taking Embodiment 3 and Comparative Example 1 as an electrolyte solution of a negative electrode-free primary battery.

LiPF$_6$ was dissolved with FEC/TTE serving as a solvent to form an electrolyte solution of LiPF$_6$ at a concentration of 1 M, and a volume ratio of the FEC to the TTE was 3:7. In FIG. 10A to FIG. 10C, Embodiment 3 was marked as EFC/TTE to make the content shown in the figures more concise and easier to understand.

Comparative Example 1

LiPF$_6$ was dissolved with EC/DEC serving as a solvent to form an electrolyte solution of LiPF$_6$ at a concentration of 1 M, and a volume ratio of the EC to the DEC was 1:1. In FIG. 10A to FIG. 10C, Comparative Example 1 was marked as EC/DEC to make the content shown in the figures more concise and easier to understand.

Experiment 1

Figure 3A:
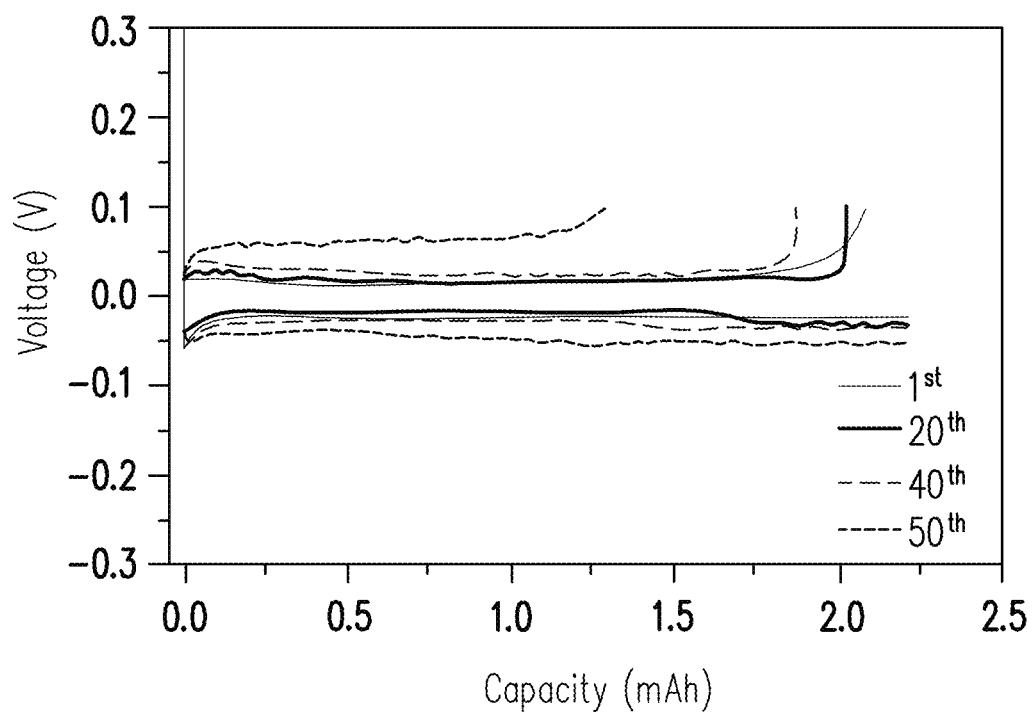
FIG. 3A and FIG. 3B are relational graphs between a voltage and a capacity in a half battery test carried out by respectively taking Embodiment 1 and Embodiment 2 as an electrolyte solution of a negative electrode-free primary battery.
Figure 3B:
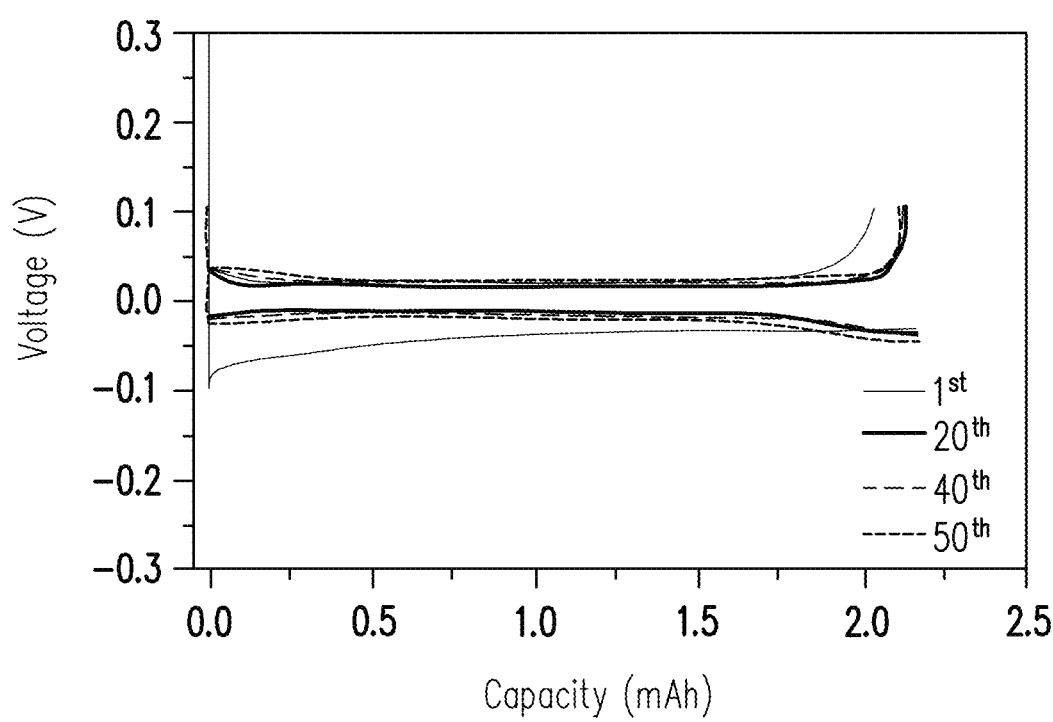
Figure 3C:
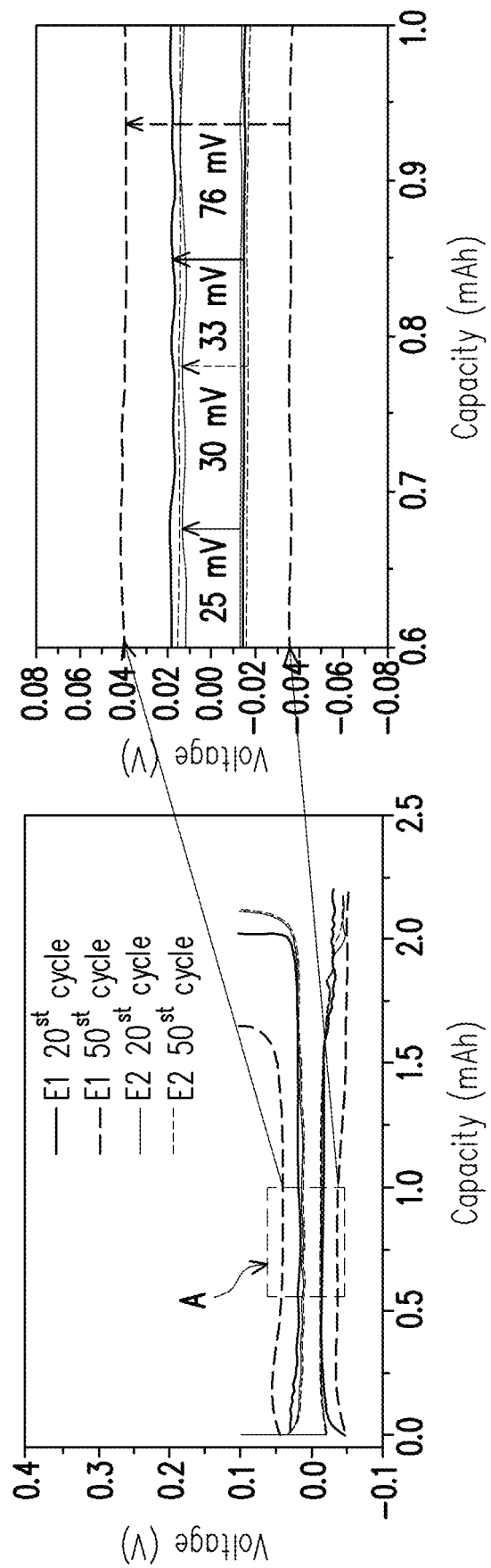
FIG. 3C is a comparison diagram for 20 cycles and 50 cycles in FIG. 3A and FIG. 3B.
Figure 4:
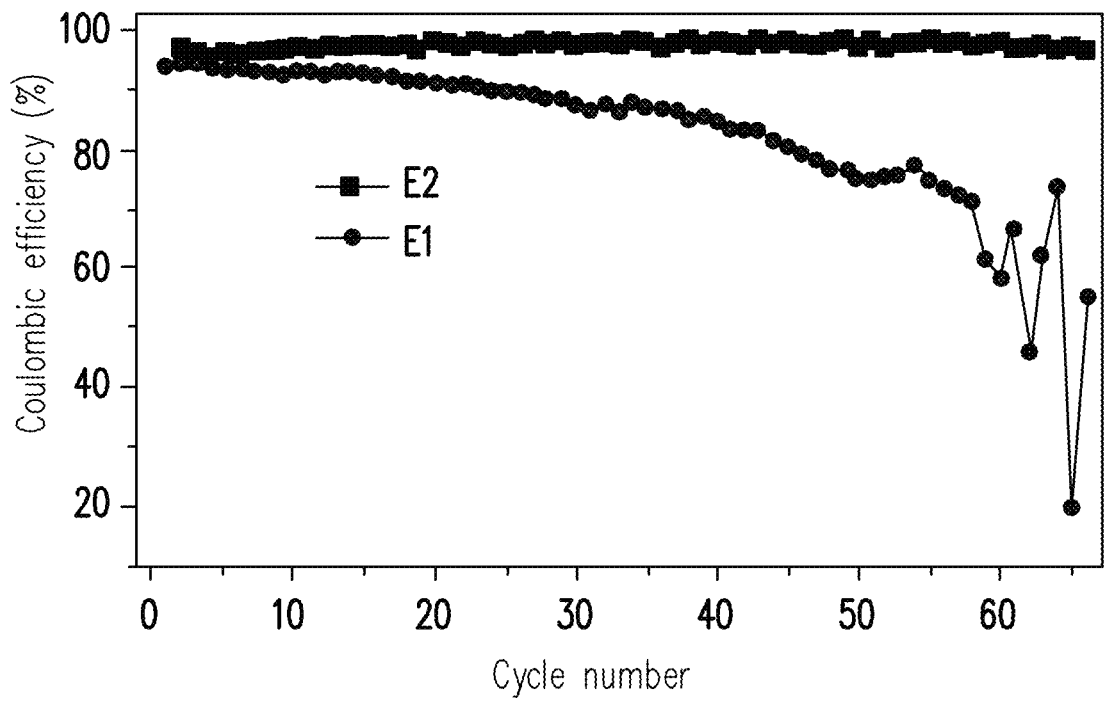
FIG. 4 is a relational graph between the coulombic efficiency and a cycle number in a half battery test carried out by taking Embodiment 1 and Embodiment 2 as an electrolyte solution of a negative electrode-free primary battery.
Figure 5:
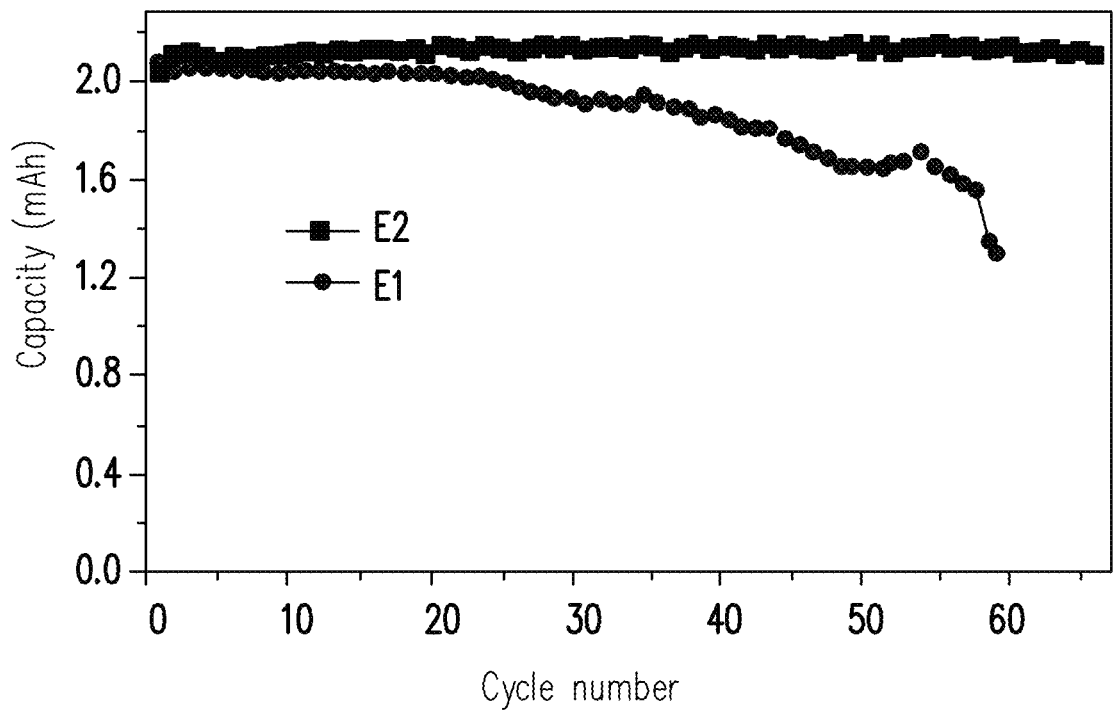
FIG. 5 is a relational graph between a capacity and a cycle number in a half battery test carried out by taking Embodiment 1 and Embodiment 2 as an electrolyte solution of a negative electrode-free primary battery.

A half battery electrochemical test was carried out by taking electrolyte solutions of Embodiment 1 and Embodiment 2 as an electrolyte solution of the negative electrode-free primary battery. The negative electrode current collector was a copper foil, so the negative electrode-free primary battery may be expressed as a half battery (Li∥Cu). Test results are shown in FIG. 3A to FIG. 3C, FIG. 4 and FIG. 5. FIG. 3A and FIG. 3B are relational graphs between a voltage and a capacity in a half battery test carried out by respectively taking Embodiment 1 and Embodiment 2 as an electrolyte solution of the negative electrode-free primary battery. FIG. 3C is a comparison diagram for 20 cycles and 50 cycles in FIG. 3A and FIG. 3B. FIG. 4 is a relational graph between the coulombic efficiency and a cycle number in a half battery test carried out by taking Embodiment 1 and Embodiment 2 as an electrolyte solution of the negative electrode-free primary battery. FIG. 5 is a relational graph between a capacity and a cycle number in a half battery test carried out by taking Embodiment 1 and Embodiment 2 as an electrolyte solution of the negative electrode-free primary battery. It should be noted that $1^{st}$, $20^{th}$, $40^{th}$ and $50^{th}$ shown in FIG. 3A to FIG. 3C indicate cycle numbers (in the same way, the same or similar numerals in other drawings also indicate the cycle numbers). Each cycle includes steps of deposition (or plating) and dissolving (or stripping). When a negative voltage (less than 0 V) is applied, Li may be deposited on the copper foil; and when a positive voltage (greater than 0 V) is applied, Li will be dissolved on the copper foil. Therefore, under the same cycle number, a relational curve between the voltage and the capacity of the Li dissolution will be shown above 0 V, and a relational curve between the voltage and the capacity of the Li deposition will be shown below 0 V. The right picture in FIG. 3C is an enlarged view of a portion framed by A in the left picture in FIG. 3.

It may be known from the results shown in FIG. 3A to FIG. 3C that after the primary battery taking Embodiment 1 as an electrolyte solution has undergone 20 cycles (marked as E1 $20^{th}$ cycle in FIG. 3C), a voltage difference between the dissolution and the deposition of Li is 33 mV, and after the primary battery taking Embodiment 1 as the electrolyte solution has undergone 50 cycles (marked as E1 $50^{th}$ cycle in FIG. 3C), a voltage difference between the dissolution and the deposition of Li is 76 mV. After the primary battery taking Embodiment 2 as the electrolyte solution has undergone 20 cycles (marked as E2 $20^{th}$ cycle in FIG. 3C), a voltage difference between the dissolution and the deposition of Li is 25 mV, and after the primary battery taking Embodiment 2 as the electrolyte solution has undergone 50 cycles (marked as E2 $50^{th}$ cycle in FIG. 3C), a voltage difference between the dissolution and the deposition of Li is 30 mV. Therefore, the negative electrode-free primary battery taking the electrolyte solution of Embodiment 2 as the electrolyte solution is relatively good in performance.

It may be seen from the results shown in FIG. 4 and FIG. 5 that compared with Embodiment 1, the negative electrode-free primary battery taking the electrolyte solution of Embodiment 2 as an electrolyte solution still has high coulombic efficiency after undergoing multiple cycles, and has a capacity value that is basically the same as that of the first cycle.

Experiment 2

Figure 6A:
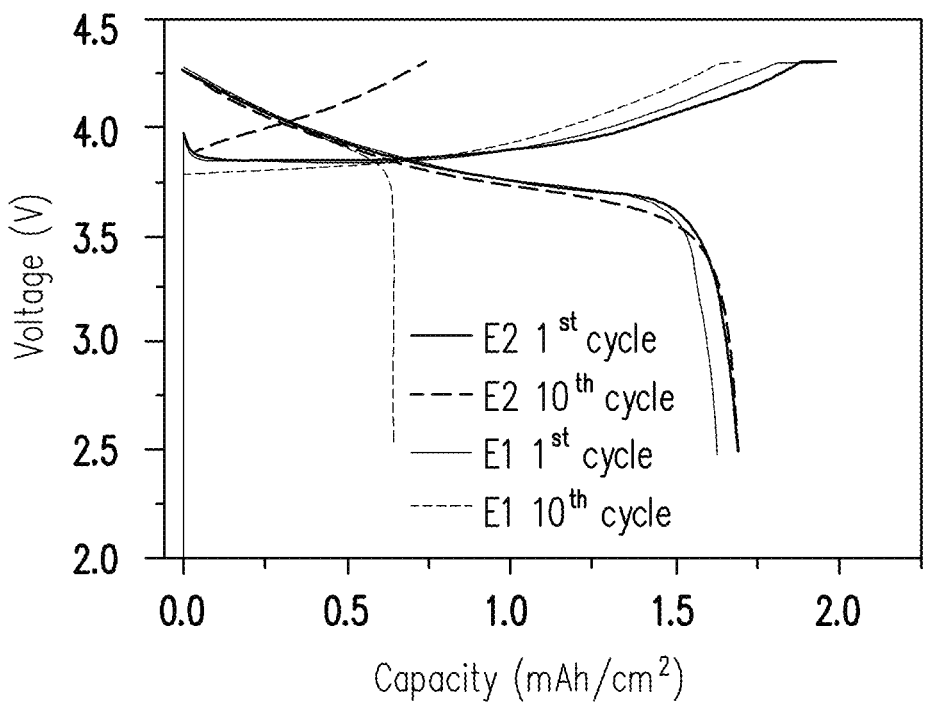
FIG. 6A is a charge/discharge curve graph in a full battery test carried out by taking Embodiment 1 and Embodiment 2 as an electrolyte solution of a negative electrode-free primary battery.
Figure 6B:
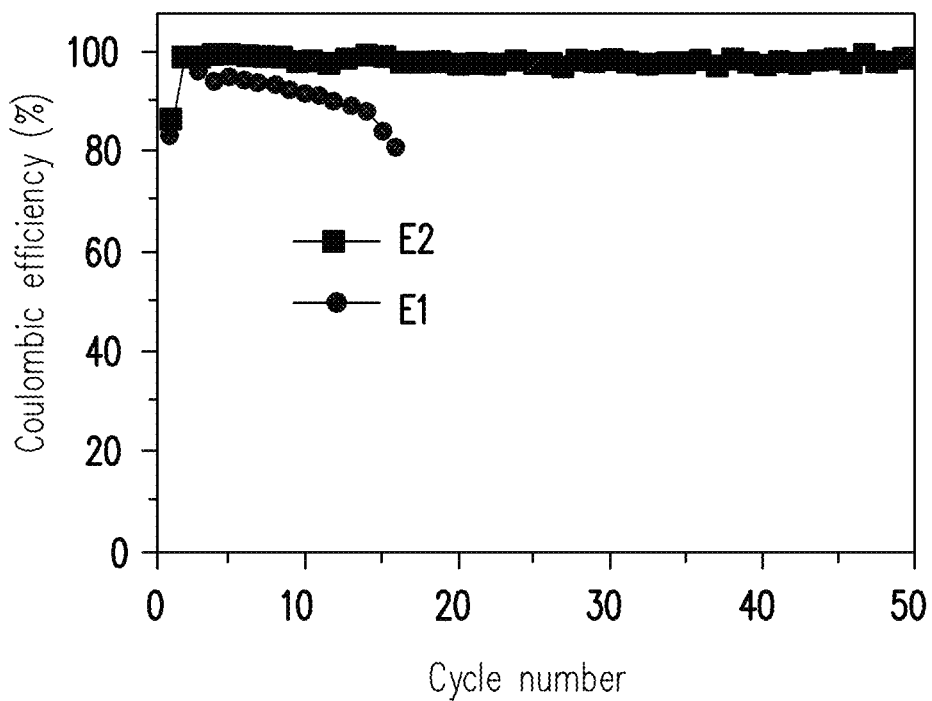
FIG. 6B is a relational graph between the coulombic efficiency and a cycle number in a full battery test carried out by taking Embodiment 1 and Embodiment 2 as an electrolyte solution of a negative electrode-free primary battery.
Figure 6C:
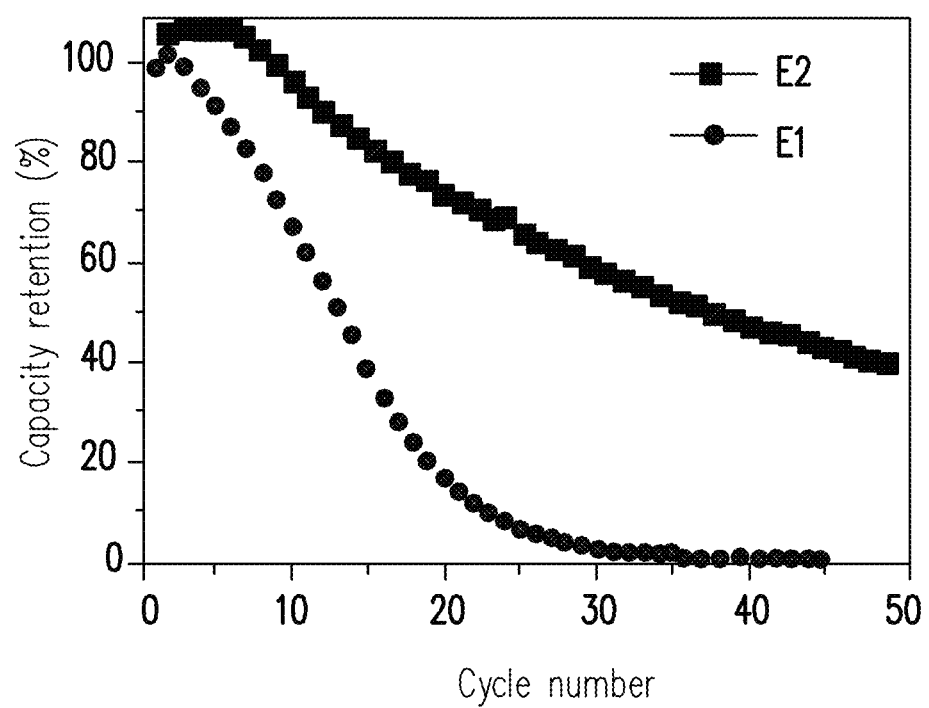
FIG. 6C is a relational graph between the capacity retention and a cycle number in a full battery test carried out by taking Embodiment 1 and Embodiment 2 as an electrolyte solution of a negative electrode-free primary battery.

A full battery electrochemical test was carried out by taking the electrolyte solutions of Embodiment 1 and Embodiment 2 as an electrolyte solution of the negative electrode-free primary battery. The negative electrode current collector was a copper foil, and the positive electrode current collector was Lithium nickel manganese cobalt oxides (NMC), so the negative electrode-free primary battery may be expressed as a full battery (Cu∥NMC). Test results are shown in FIG. 6A to FIG. 6C. FIG. 6A is a charge/discharge curve graph in a full battery test carried out by taking Embodiment 1 and Embodiment 2 as an electrolyte solution of the negative electrode-free primary battery. A curve where a voltage increases as a capacity rises is a charge curve, and a curve where a voltage decreases as a capacity drops is a discharge curve. FIG. 6B is a relational graph between the coulombic efficiency and a cycle number in a full battery test carried out by taking Embodiment I and Embodiment 2 as an electrolyte solution of the negative electrode-free primary battery. FIG. 6C is a relational graph between the capacity, retention and a cycle number in a full battery test carried out by taking Embodiment 1 and Embodiment 2 as an electrolyte solution of the negative electrode-free primary battery.

It may be seen from the results shown in FIG. 6A to FIG. 6C that when the electrolyte solution of Embodiment 2 is taken as an electrolyte solution of the negative electrode-free primary battery, the negative electrode-free primary battery is relatively good in charge/discharge performance (as shown in FIG. 6A), coulombic efficiency (as shown in FIG. 6B) and capacity retention (as shown in FIG. 6C). In FIG. 6A, $1^{st}$ and $20^{th}$ respectively denote that the primary battery undergoes 1 cycle and 20 cycles.

Experiment 3

Figure 7B:
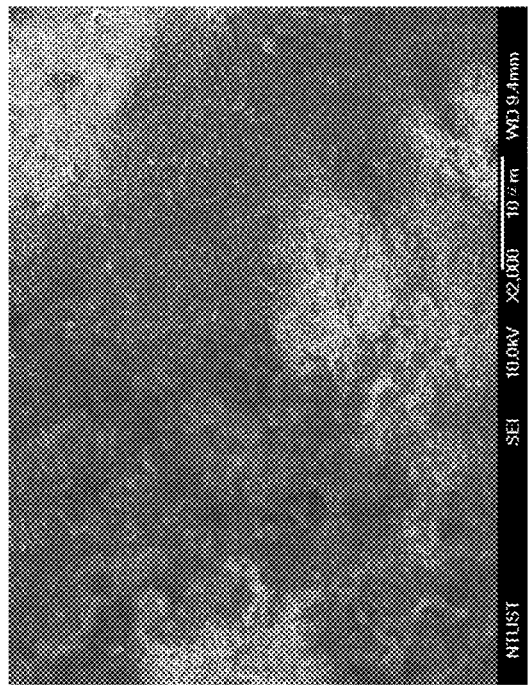
FIG. 7A and FIG. 7B are scanning electron microscope (SEM) images of a negative electrode current collector after 5 charge/discharge cycles and takes electrolyte solutions of Embodiment 1 and Embodiment 2 as an electrolyte solution of a battery.
Figure 7A:
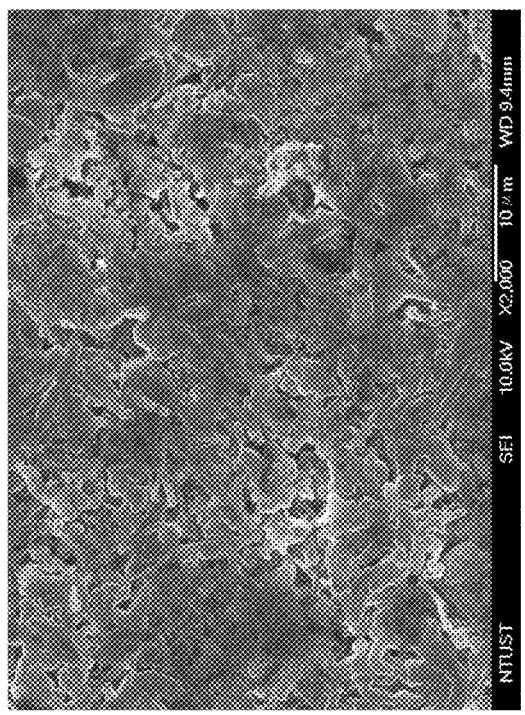

In the above Experiment 2, after the primary battery underwent 5 charge/discharge cycles, in a completely discharged state, surface morphology analysis was carried out on the negative electrode current collector (i.e., a copper foil). Results are shown in FIG. 7A and FIG. 7B. FIG. 7A and FIG. 7B are scanning electron microscope (SEM) images of the negative electrode current collector after 5 charge/discharge cycles and takes electrolyte solutions of Embodiment 1 and Embodiment 2 as an electrolyte solution of a battery.

It may be seen from the results shown in FIG. 7A and FIG. 7B that when the electrolyte solution of Embodiment 2 is taken as the electrolyte solution of the negative electrode-free primary battery, the surface morphology of the negative electrode current collector is relatively flat, and no other substances exist on the surface.

Experiment 4

Figure 8:
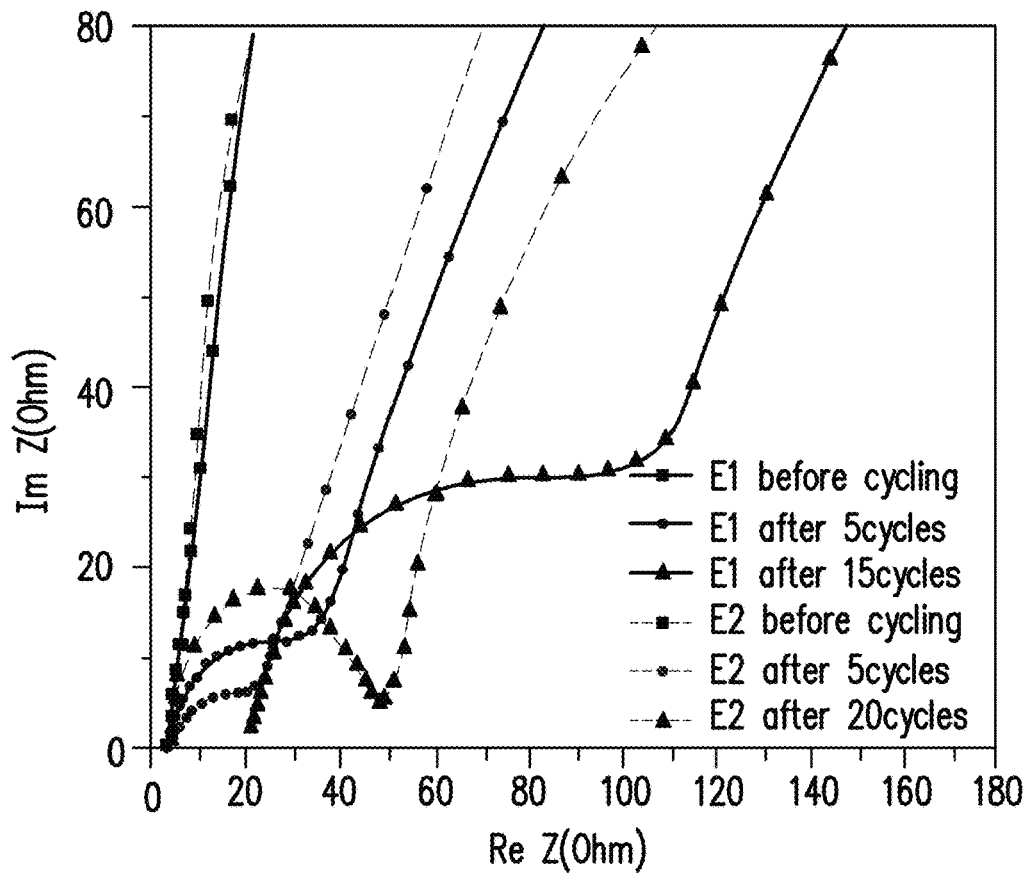
FIG. 8 is a curve graph of different cycle numbers of Embodiment 1 and Embodiment 2 in an electrochemical impedance spectroscopy (EIS) test.

An alternating current impedance test was carried out by taking the electrolyte solutions of Embodiment 1 and Embodiment 2 as an electrolyte solution of the negative electrode-free primary battery. Test results are shown in FIG. 8. FIG. 8 is a curve graph of different cycle numbers of Embodiment 1 and Embodiment 2 in an electrochemical impedance spectroscopy (EIS) test. The E1 before cycling and the E2 before cycling shown in FIG. 8 respectively denote curves of the primary battery taking Embodiment 1 and Embodiment 2 as the electrolyte solution before cycling. The E1 after 5 cycles and the E2 after 5 cycles shown in FIG. 8 respectively denote curves of the primary battery taking Embodiment 1 and Embodiment 2 as the electrolyte solution after 5 cycles. The E1 after 15 cycles and the E2 after 20 cycles shown in FIG. 8 respectively denote curves of the primary battery taking Embodiment 1 and Embodiment 2 as the electrolyte solution after 15 and 20 cycles.

It may be seen from the results shown in FIG. 8 that when the electrolyte solution of Embodiment 2 is taken as the electrolyte solution of the negative electrode-free primary battery, the negative electrode-free primary battery has relatively good impedance performance.

Experiment 5

Figure 9:
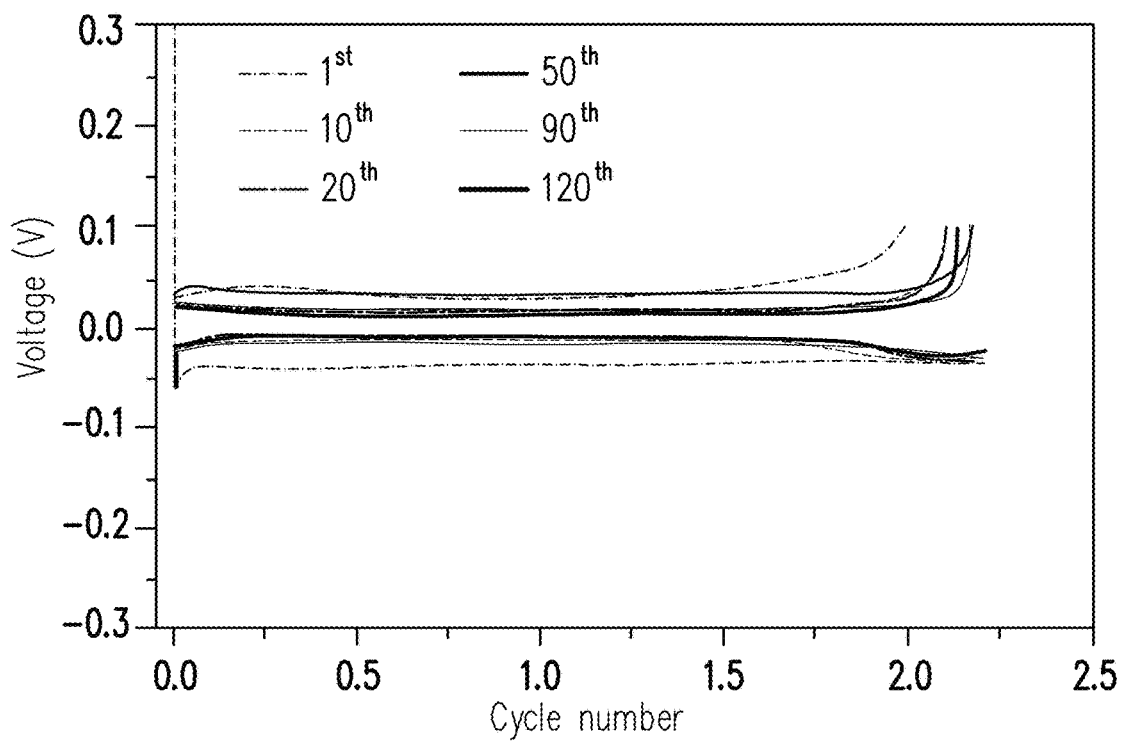
FIG. 9 is a relational graph between a voltage and a capacity in a half battery test carried out by taking Embodiment 3 as an electrolyte solution of a negative electrode-free primary battery.

A half battery electrochemical test was carried out by taking the electrolyte solution of Embodiment 3 as an electrolyte solution of the negative electrode-free primary battery. The negative electrode current collector was a copper foil, so the negative electrode-free primary battery may be expressed as a half battery (Li∥Cu). Test results are shown in FIG. 9. FIG. 9 is a relational graph between a voltage and a capacity in a half battery test carried out by taking Embodiment 3 as an electrolyte solution of the negative electrode-free primary battery. $1^{st}$, $10^{th}$, $20^{th}$, $50^{th}$, $90^{th}$ and $120^{th}$ shown in FIG. 9 denote cycle numbers.

It may be seen from the results shown in FIG. 9 that when the electrolyte solution of Embodiment 3 is taken as the electrolyte solution of the negative electrode-free primary battery, the negative electrode-free primary battery has good electrical performance.

Experiment 6

Figure 11A:
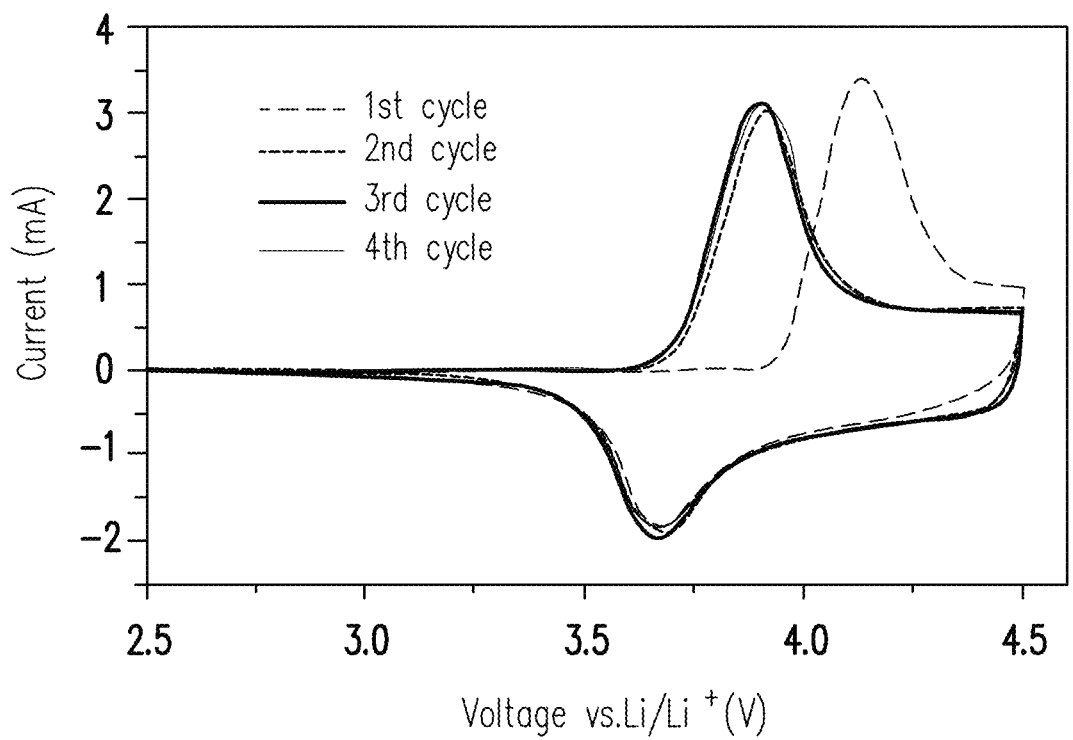
FIG. 11A and FIG. 11B are charge/discharge curve graphs in a full battery test carried out by taking Embodiment 3 and Comparative Example 1 as an electrolyte solution of a negative electrode-free primary battery respectively.
Figure 11B:
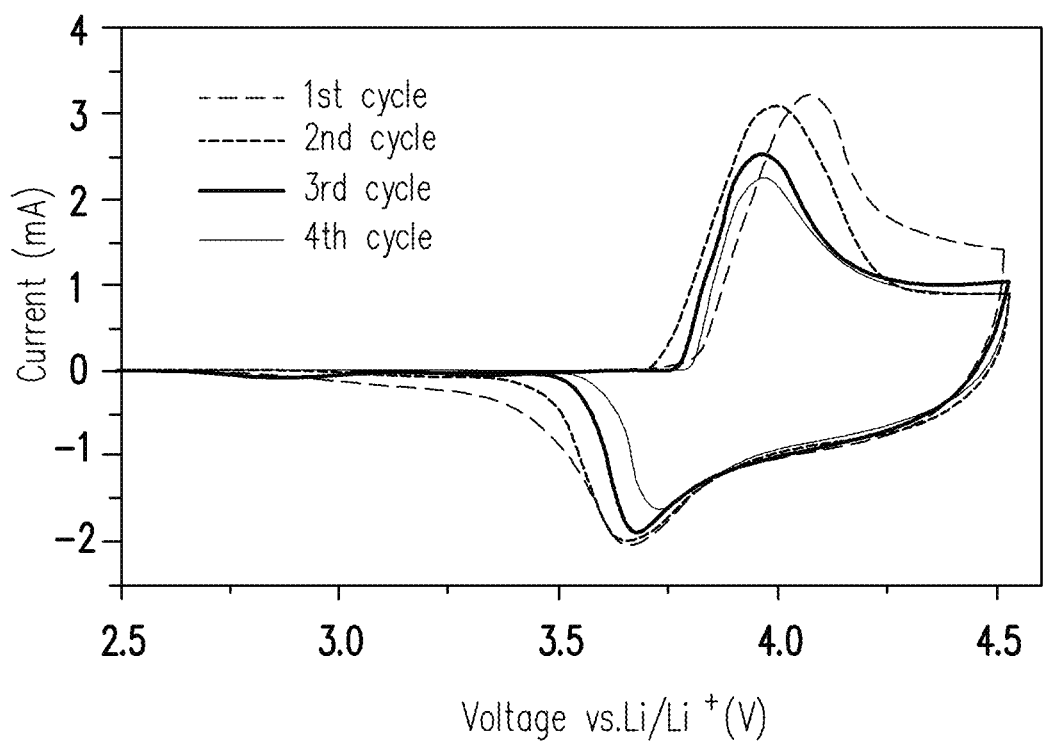

A full battery electrochemical test was carried out by taking the electrolyte solutions of Embodiment 3 (denoted as FEC/TTE in the figure) and Comparative Example 1 (denoted as EC/DEC in the figure) as an electrolyte solution of the negative electrode-free primary battery. The negative electrode current collector was a copper foil, and the positive electrode current collector was NMC, so the negative electrode-free primary battery may be expressed as a full battery (Cu∥NMC). Test results are shown in FIG. 10A to FIG. 10C, FIG. 11A and FIG. 11B. FIG. 10A is a relational graph between a voltage and a capacity in a full battery test carried out by taking Embodiment 3 and Comparative Example 1 as the electrolyte solution of the negative electrode-free primary battery. FIG. 10B is a relational graph between a capacity and a cycle number in the full battery test carried out by taking Embodiment 3 and Comparative Example 1 as the electrolyte solution of the negative electrode-free primary battery. FIG. 10C is a relational graph between the coulombic efficiency and a cycle number in the full battery test carried out by taking Embodiment 3 and Comparative Example 1 as the electrolyte solution of the negative electrode-free primary battery. FIG. 11A and FIG. 11B are charge/discharge curve graphs in the full battery test carried out by taking Embodiment 3 and Comparative Example 1 as the electrolyte solution of the negative electrode-free primary battery.

It may be seen from the results shown in FIG. 10A to FIG. 10C as well as FIG. 11A and FIG. 11B that when the electrolyte solution of Embodiment 3 is taken as an electrolyte solution of the negative electrode-free primary battery, the negative electrode-free primary battery is relatively good in charge/discharge performance (as shown in FIG. 11A), stability (as shown in FIG. 11B) and coulombic efficiency (as shown in FIG. 10C).

Based on the above, in the disclosure, since the electrode assembly for the primary battery does not include the negative electrode material, a space originally configured to hold the negative electrode material in the primary battery can be configured to receive more positive electrode material (or referred to as a cathode material) and electrolyte. Therefore, under the same volume, the primary battery can provide a higher energy density.

What is claimed is:

1. An anode active material-free primary battery, comprising:
an electrode assembly, comprising:
a separator, having a positive electrode side and a negative electrode side opposite to each other;
a positive electrode, located at the positive electrode side of the separator, and comprising a positive electrode current collector and a positive electrode material; wherein, the positive electrode material comprises $LiMnO_2$, $LiMn_2O_4$, $LiCoO_2$, $Li_2Cr_2O_7$, $LiCrO_4$, $LiNiO_2$, $LiFeO_2$, $LiNixCo_{1-x}O_2$, $LiFePO_4$, $LiMn_{0.5}Ni_{0.5}O_2$, $LiMn_{1/3}Ni_{1/3}O_2$, $Li[Ni_{x/2} Li_{(1-x)/3} Mn_{(2-x/2)/3}]O_2$, $Li_2S$ or a combination thereof, x is greater than 0 and less than 1;
a negative electrode current collector; located at the negative electrode side of the separator; and
an electrolyte solution provided between the negative electrode current collector and the positive electrode current collector,
wherein the electrode assembly is free from anode active material before charging or activation,
wherein the electrolyte is a lithium salt solution comprising ethylene carbonate, diethyl carbonate as a second organic solvent and fluoroethylene carbonate as a first organic solvent with a volume ratio of the second organic solvent to the first organic solvent as 1:1; and the lithium salt solution further comprises $LiPF_6$ as the lithium salt in a concentration of 2M.

2. The anode active material-free primary battery according to claim 1, wherein at least one of the positive electrode current collector or the negative electrode current collector comprises a metal foil or metal sponge.

* * * * *